United States Patent

Herrmann-Schönherr et al.

[11] Patent Number: 5,863,986
[45] Date of Patent: Jan. 26, 1999

[54] POLYMER ALLOY BLEND OR COMPOSITION AND SHAPED ARTICIAL OBTAINED THEREFROM

[75] Inventors: Otto Herrmann-Schönherr, Bensheim; Frank Osan, Kelkheim, both of Germany

[73] Assignees: Ticona GmbH, Frankfurt, Germany; Mitsui Petrochemical Industries, Ltd, Tokyo, Japan

[21] Appl. No.: 787,889

[22] Filed: Jan. 23, 1997

Related U.S. Application Data

[63] Continuation of Ser. No. 361,765, Dec. 22, 1994, abandoned.

[30] Foreign Application Priority Data

Dec. 27, 1993 [DE] Germany .......................... 43 44 706.6

[51] Int. Cl.$^6$ ............................. C08L 45/00; C08L 51/00; C08L 53/00
[52] U.S. Cl. ................................ 525/63; 525/64; 525/75; 525/98; 525/165; 525/210; 525/211
[58] Field of Search ................................... 525/63, 64, 75, 525/98, 165, 210, 211

[56] References Cited

U.S. PATENT DOCUMENTS

| | | | |
|---|---|---|---|
| 4,104,325 | 8/1978 | Ueshima | 536/281 X |
| 5,094,806 | 3/1992 | Laughner | 264/523 |
| 5,218,049 | 6/1993 | Yamamoto | 525/97 |
| 5,273,706 | 12/1993 | Laughner | 264/540 |
| 5,304,606 | 4/1994 | Yamamoto | 525/210 |
| 5,359,001 | 10/1994 | Epple et al. | 525/97 |

FOREIGN PATENT DOCUMENTS

| | | |
|---|---|---|
| 0 335 985 | 10/1988 | European Pat. Off. . |
| 0 566 988 | 10/1993 | European Pat. Off. . |
| 27 31 445 | 2/1978 | Germany . |
| 42 02 108 | 7/1993 | Germany . |

OTHER PUBLICATIONS

*Polymer*, vol. 28, No.7, Jul. 1987, pp. 1703–1711.

*Primary Examiner*—Jeff Mullis

[57] ABSTRACT

Polymer alloy comprising a) one or more cycloolefin copolymers and b) one or more types of core-shell particles and c) one or more block copolymers.

9 Claims, No Drawings

POLYMER ALLOY BLEND OR COMPOSITION AND SHAPED ARTICIAL OBTAINED THEREFROM

This is a continuation of our application Ser. No. 08/361,765, filed Dec. 22, 1994, now abandoned.

The present invention relates to a polymer alloy comprising cycloolefin copolymers (COC), core-shell particles and block copolymers. The polymer alloy blend, or composition of the invention is tough on impact and has a high flexural strength and elongation at break.

Impact-toughened polymers are sufficiently well known and suitable for many applications (A. E. Platt, Rubber Modification of Plastics, Advances in Polymer Science, page 437).

It is also known that the impact toughness and the elongation at break of polymers can be improved by alloying. Thus, the impact toughness of brittle polymers can be improved by alloying with polymer systems which are made up completely or partially of rubbers having low glass transition temperatures (Polymer News, Vol. 16 (1991), pages 198–206; D. R. Paul in Encyclopedia of Polymer Science, Pergamon Press, N.Y. (1989), p. 437).

In particular, core-shell particles have been proposed for impact modification (Res. Discl. 323, pages 925–926; P. A. Lovell et al., Polymer, 34 (1993) page 61; M. Lu et al., Polymer, 34 (1993) page 1874; C. B. Bucknall, Rubber-modified Plastics, Comprehensive Polymer Science, Pergamon Press (1989), pages 27–49). These are used as impact modifiers for, for example, PVC or PMMA (Gächter/Müller Kunststoff-Additive page XXIX–XXXIV, Carl Hauser, Munich, 1983 and C. B. Bucknall, Rubber-modified Plastics, Comprehensive Polymer Science, Pergamon Press (1989), pages 27–49). Since, however, the mechanical properties of impact-modified polymers cannot be predicted by addition of the properties of the individual components (D. R. Paul et al. in Encyclopedia of Polymer Science, Vol. 12, 1984), the impact modification of polymers is a largely empirical exercise. This means that core-shell particles have to be specifically tailored to each polymer which is to be impact-modified and each application in complicated optimization tests (J. Oshilma, Seni Gakkaishi, 48(5) (1992) page 274; M. Lu et al., Polymer, 34 (1993) page 1874). Correspondingly, commercially available core-shell particles are in each case suitable for only very particular polymers and applications.

It is also known that brittle polymers can be impact-modified by simultaneous use of core-shell particles and block copolymers (Polymer 28, 1703, 1987). However, the simultaneous use of core-shell particles and block copolymers can lead to a decrease in the impact toughness compared with the impact toughness achieved with exclusive use of core-shell particles.

An essential prerequisite for achieving sufficient impact toughness is a good phase adhesion or miscibility between matrix polymer and the rubber-containing polymer (D. R. Paul in Encyclopedia of Polymer Science Vol. 12 (1984) p. 437; A. E. Platt in Comprehensive Polymer Science, Pergamon Press N.Y. (1989) p. 437), C. B. Bucknall in Toughened Plastics, Applied Science Publishers, London (1977) pp. 209–210; M. Lu et al., Polymer, 34 (1993) p. 1874).

Like all polyolefins, COCs too (EP 203 799, EP 283 164, EP 407 870, EP 485 893, EP 503 422, DD 777 317, DD 231 070, DD 246 903, EP 203 799, EP 283 164, EP 156 464) are poorly miscible with other polymers and thus have poor phase adhesion to other polymers. The compatibility and with it the phase adhesion can, according to D. W. van Krevelen (Properties of Polymers, Elsevler, Amsterdam-Oxford-New York, 1976, Ch. VII), be estimated via the solubility parameter delta, with values of about 13.5 $J^{1/2}cm^{3/2}$ being obtained for COCs. These values are significantly below those for typical impact-modified polymers.

For impact modification of COCs, it has thus been hitherto necessary to cross link these with the rubber-containing polymer (JP 92-170 453, JP 92-180 454, JP 92-356 353). A reliable and reproducible setting of the morphologies and degrees of cross linking, and the impact toughness and rheological properties associated therewith, is difficult to achieve by this procedure. In particular, the reproducibility of the specified properties is sensitive to parameters such as, for example, processing conditions, cross linker content, temperature and time.

It is therefore an object of the invention to provide a polymer which is tough on impact and which avoids the disadvantages of the prior art.

It has now surprisingly been found that alloys which contain COCs, core-shell particles and block copolymers are tough on impact and have a good flexural strength and elongation at break. In particular, even low contents of block copolymers lead to good mechanical properties. In addition, COCs can be impact modified with a multiplicity of various types of core-shell particles, without the particles having to be laboriously optimized for the polymer and the respective application. In addition, the alloys can be processed in a technically simple manner.

The present invention thus provides a polymer alloy blend, or composition which comprises a) one or more cycloolefin copolymers, b) one or more types of core-shell particles and c) one or more block copolymers.

The alloy of the invention preferably comprises a COC, particularly preferably one COC, one type of core-shell particle and one block copolymer.

Cycloolefin copolymers suitable for the purposes of the invention have glass transition temperatures between 50° and 250° C., preferably between 100° and 200° C., particularly preferably between 100° and 150° C.

The alloy of the invention preferably comprises COCs which contain 0.1–99% by weight, based on the total mass of the COC, of structural units which are obtained by polymerization of at least one polycyclic olefin which preferably has the formula I, II, III, IV, V or VI,

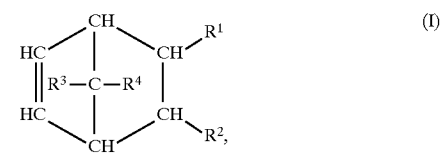

(I)

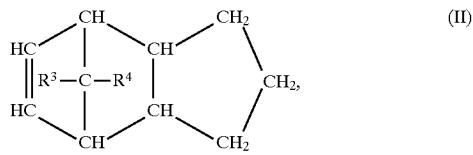

(II)

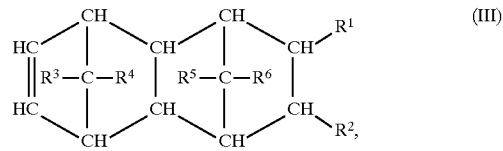

(III)

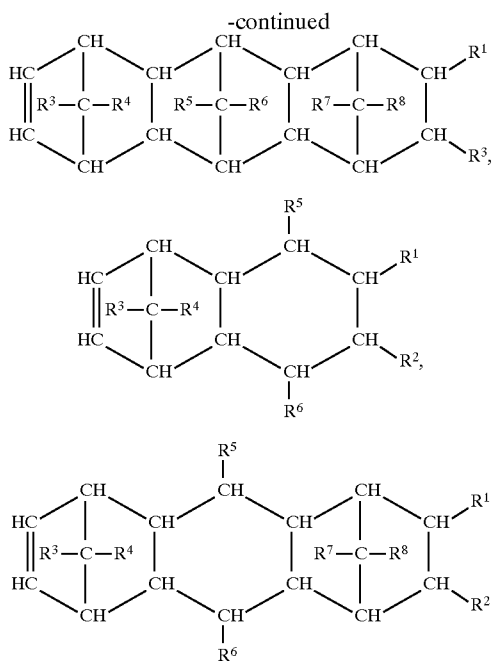

where the radicals $R^1$, $R^2$, $R^3$, $R^{41}$, $R^5$, $R^6$, $R^7$ and $R^8$ are identical or different and are a hydrogen atom or a $C_1$–$C_{20}$ hydrocarbon radical such as a linear or branched $C_1$–$C_8$-alkyl radical, $C_6$–$C_{18}$-aryl radical, $C_7$–$C_{20}$-alkylenearyl radical, a cyclic or acyclic $C_2$–$C_{10}$-alkenyl radical, or two or more radicals $R^1$ to $R^8$ form a ring, and the radicals $R^1$ to $R^6$ in the various formulae can have different meanings, from 0 to 95% by weight, based on the total mass of the COC, of structural units which are obtained by polymerization of at least one monocyclic olefin, in particular of the formula VII

 (VII)

where n is a number from 2 to 10, and from 0 to 99% by weight, preferably 0.1 to 99% by weight, based on the total mass of the COC, of structural units which are obtained by polymerization of at least one acyclic olefin, in particular of the formula VIII

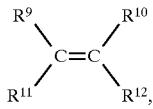 (VIII)

where the radicals $R^9$, $R^{10}$, $R^{11}$ and $R^{12}$ are identical or different and are a hydrogen atom or a $C_1$–$C_{20}$-hydrocarbon radical such as a $C_1$–$C_8$-alkyl radical or $C_6$–$C_{14}$-aryl radical.

The cycloolefin copolymers preferably comprise structural units derived from one or more cycloolefins, in particular polycyclic olefins of the formula I or III, and one or more acyclic olefins, preferably of the formula VIII, in particular α-olefins having 2–20 carbon atoms. Particular preference is given to cycloolefin copolymers whose structural units are derived from one polycyclic olefin of the formula I or III and one acyclic olefin of the formula VIII.

Preference is given to COCs which comprise structural units derived from polycyclic olefins having a norbornene base structure, particularly preferably norbornene or tetra-cyclododecene. Preference is also given to COCs which comprise structural units derived from acyclic olefins having terminal double bonds such as α-olefins, particularly preferably ethylene or propylene. Particular preference is given to norbornene/ethylene and tetracyclododecene/ethylene copolymers. The proportion of structural units which are derived from acyclic olefins of the formula VIII is from 0 to 99% by weight, preferably 5–80% by weight, particularly preferably 10–60% by weight, based on the total mass of the COC.

The COCs are preferably prepared at temperatures of from –78° to 150° C. and a pressure of from 0.01 to 64 bar in the presence of a catalyst which comprises at least one cocatalyst and at least one transition metal compound. Suitable transition metal compounds are metallocenes, in particular stereorigid metallocenes, and compounds based on titanium and vanadium. Such catalyst systems and the preparation of the COCs suitable for the purposes of the invention are described, for example, in EP 203 799, EP 283 14, EP 407 870, EP 485 893, EP 503 422, DD 777 317, DD 231 070, EP 203 799, which is hereby expressly incorporated by reference.

Examples of transition metal compounds used are:
rac-dimethylsilylbis(1-indenyl)zirconium dichloride,
rac-dimethylgermylbis(1-indenyl)zirconium dichloride,
rac-phenylmethylsilylbis(1-indenyl)zirconium dichloride,
rac-phenylvinylsilylbis(1-indenyl)zirconium dichloride,
1-silacyclobutylbis(1-indenyl)zirconium dichloride,
rac-diphenylsilylbis(1-indenyl)hafnium dichloride,
rac-phenylmethylsilylbis(1-indenyl)hafnium dichloride,
rac-diphenylsilylbis(1-indenyl)zirconium dichloride,
rac-ethylene-1,2-bis(1-indenyl)zirconium dichloride,
dimethylsilyl(9-fluorenyl)-(cyclopentadienyl)zirconium dichloride,
diphenylsilyl(9-fluorenyl)-(cyclopentadienyl)zirconium dichloride,
bis(1-indenyl)zirconium dichloride,
diphenylmethylene(9-fluorenyl)cyclopentadienyl zirconium dichloride,
isopropylene(9-fluorenyl)cyclopentadienyl zirconium dichloride,
phenylmethylmethylene(9-fluorenyl)cyclopentadienyl zirconium dichloride,
isopropylene(9-fluorenyl)-(1-(3-isopropyl)cyclopentadienyl)zirconium dichloride,
isopropylene(9-fluorenyl)(1-(3-methyl)cyclopentadienyl)zirconium dichloride,
diphenylmethylene(9-fluorenyl)(1-(3-methyl)cyclopentadienyl)zirconium dichloride,
methylphenylmethylene(9-fluorenyl)(1-(3-methyl)cyclopentadienyl)zirconium dichloride,
dimethylsilyl(9-fluorenyl)(1-(3-methyl)cyclopentadienyl)zirconium dichloride,
diphenylsilyl(9-fluorenyl)(1-(3-methyl)cyclopentadienyl)zirconium dichloride,
diphenylmethylene(9-fluorenyl)(1-(3-tert-butyl)cyclopentadienyl)zirconium dichloride,
isopropylene(9-fluorenyl)(1-(3-tert-butyl)cyclopentadienyl)zirconium dichloride,
isopropylene(cyclopentadienyl)-(1-indenyl)zirconium dichloride,
diphenylcarbonyl(cyclopentadienyl)-(1-indenyl)zirconium dichloride,
dimethylsilyl(cyclopentadienyl)-(1-indenyl)zirconium dichloride,
isopropylene(methylcyclopentadienyl)-(1-indenyl)zirconium dichloride,
4-($\eta^5$-cyclopentadienyl)-4,7,7-trimethyl($\eta^5$-4,5,6,7-tetrahydroindenyl)zirconium dichloride, 4-($\eta^5$-3-methylcyclopentadienyl)-4,7,7-trimethyl($\eta^5$-4,5,6,7-tetrahydroindenyl)zirconium dichloride,
4-($\eta^5$-3-isopropylcyclopentadienyl)-4,7,7-trimethyl-($\eta$-4,5,6,7-tetrahydroindenyl)zirconium dichloride,
4-($\eta^5$-3-methylcyclopentadienyl)-4,7-dimethyl-7-phenyl ($\eta^5$-4,5,6,7-tetrahydroindenyl)zirconium dichloride,
4-($\eta^5$-3-methylcyclopentadienyl)-4,7-dimethyl-7-n-butyl ($\eta^5$-4,5,6,7-tetrahydroindenyl)zirconium dichloride,
4-($\eta^5$-cyclopentadienyl)-4,7-dimethyl-7-n-butyl($\eta^5$-4,5,6,7-tetrahydroindenyl)zirconium dichloride,
4-($\eta^5$-cyclopentadienyl)-2,4,7,7-tetramethyl-($\eta^5$-4,5,6,7-tetrahydroindenyl)zirconium dichloride,
and analogous hafnocenes, titanium tetrachloride, $VOCl_3$, $VOCl_2(OCH_3)$, $VOCl_2(OC_2H_5)$ and $VOCl(OC_2H_5)_2$.

Among these, preference is given to:
rac-dimethylsilylbis(1-indenyl)zirconium dichloride,
rac-phenylmethylsilylbis (1-indenyl)zirconium dichloride,
rac-phenylvinylsilylbis(1-indenyl)zirconium dichloride,
rac-diphenylsilylbis(1-indenyl)zirconium dichloride,
rac-ethylene-1,2-bis(1-indenyl)zirconium dichloride,
isopropylene(cyclopentadienyl)-(1-indenyl)zirconium dichloride,
diphenylcarbonyl(cyclopentadienyl)-(1-indenyl)zirconium dichloride,
dimethylsilyl(cyclopentadienyl)-(1-indenyl)zirconium dichloride,
isopropylene(methylcyclopentadienyl)-(1-indenyl) zirconium dichloride and
4-($\eta^5$-cyclopentadienyl)-4,7,7-trimethyl($\eta^5$-4,5,6,7-tetrahydroindenyl)zirconium dichloride.

The cycloolefin copolymers suitable for the purposes of the invention have glass transition temperatures between 50° and 250° C., preferably between 100° and 200° C., particularly preferably between 100° and 150° C.

The COCs suitable for the purposes of the invention have viscosity numbers (determined in decalin at 135° C.) between 25 and 200 ml/g, preferably between 40 and 120 ml/g, particularly preferably between 40 and 80 ml/g.

The core-shell particles present in the alloy of the invention can comprise two (core and one shell) or more (core and a plurality of shells) alternating layers of different polymers. A common feature of these particles is that the individual layers comprise polymers having different glass transition temperatures. Here, the polymer having the lower glass transition temperature is described as the rubber phase and that having the higher glass transition temperature is described as the hard phase. The preparation of such particles can be carried out, for example, by emulsion polymerization. One or more layers can be chemically cross linked during the preparation so that the shape and size of the core-shell particle do not change during subsequent alloying with COC.

Suitable uncross-linked base materials for the cross-linked rubber phases are polymer systems whose glass transition temperatures are below 0° C., preferably below −20° C. and particularly preferably below −40° C. Suitable polymers are, in principle, all polymers which have such glass transition temperatures and are suitable for the synthesis of core-shell particles.

Core-shell particles whose rubber phases have low glass transition temperatures are particularly suitable for the preparation of alloys which are used for applications at low temperatures.

The glass transition temperatures of the rubber phases can frequently not be measured as such, but can be determined by preparing an emulsion polymer of the appropriate monomer composition, isolating this emulsion polymer and determining the glass transition temperature. A further method of determining the glass transition temperatures of the rubber phases comprises the measurement of dynamic mechanical properties of the alloys of the invention and those of the matrix polymers alone. Maxima in the loss factor curves can be regarded as measures of glass transition temperatures.

Core-shell particles suitable for the purposes of the invention contain between 10 and 90% by volume, preferably between 20 and 70% by volume, and particularly preferably between 30 and 60% by volume, of rubber phases, based on the total volume of the particles.

Core-shell particles suitable for the purposes of the invention contain between 90 and 10% by volume, preferably between 80 and 30% by volume and particularly preferably between 70 and 40% by volume of hard phases, based on the total volume of the particles.

Core-shell particles suitable for the purposes of the invention contain between 90 and 40% by volume, preferably between 80 and 30% by volume and particularly preferably between 70 and 10% by volume, of hardening phases, based on the total volume of the particles.

The preparation of core-shell particles is well known and comprehensively described in, for example, U.S. Pat. No. 3,833,682, U.S. Pat. No. 3,787,522, DE 2 116 653, DE 22 53 689, DE 41 32 497, DE 41 31 738, DE 40 40 986, U.S. Pat. No. 3,251,904, DE 33 00 526, which is hereby expressly incorporated by reference.

The rubber phases used in the core-shell particles can be homopolymers or copolymers comprising two or more types of monomer. A common feature of these homopolymers and copolymers is a glass transition below 0° C.

These homopolymers and copolymers can comprise the following monomers:

Conjugated diene monomers such as butadiene, isoprene, chloroprene, monoethylenically unsaturated monomers such as alkyl and aryl acrylates, with the alkyl radicals being able to be linear, cyclic or branched and the aryl radicals in turn being able to be substituted themselves, alkyl and aryl methacrylates, with the alkyl radicals being able to be linear, cyclic or branched and the aryl radicals in turn being able to be substituted themselves, substituted alkyl and aryl methacrylates and acrylates, with the substituents being able to be linear, cyclic or branched alkyl radicals or substituted aryl radicals, acrylonitriles and substituted acrylonitriles (e.g. methacrylonitrile, alpha-methylene glutaronitrile, alpha-ethylacrylonitrile, alpha-phenylacrylonitrile), alkyl- and arylacrylamides and substituted alkyl- and arylacrylamides, vinyl esters and substituted vinyl esters, vinyl ethers and substituted vinyl ethers, vinylamides and substituted vinylamides, vinyl ketones and substituted vinyl ketones, vinyl halides and substituted vinyl halides, olefins having one or more unsaturated double bonds as are used, for example, for the preparation of olefinic rubbers, in particular ethylene, propylene, butylene and 1,4-hexadiene and also vinyl-aromatic compounds such as styrene, alpha-methylstyrene, vinyltoluene, halostyrenes and t-butylstyrene.

Rubber phases based on organopolysiloxanes of the following formula can likewise be used for the build-up of core-shell particles,

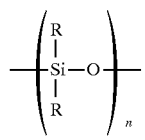

where R are identical or different alkyl or alkenyl radicals having from 1 to 10 carbon atoms, aryl radicals or substituted hydrocarbon radicals. The alkyl radicals and alkenyl radicals can here be linear, branched or cyclic.

Furthermore, use can be made of rubber phases based on fluorinated monoethylenically unsaturated compounds such as tetrafluoroethylene, vinylidene fluoride, hexafluoropropene, chlorotrifluoroethylene and perfluoro (alkyl vinyl ethers).

The rubber phases can also be cross linked, for which purpose polyfunctional unsaturated compounds as described, for example, in DE 2 116 653, U.S. Pat. No. 3,787,522 and EP 0 436 080 (which is hereby expressly incorporated by reference) can be used. Likewise described in these documents is the use of grafted monomers. These compounds are used to chemically bond a possible further shell to the underlying phase if this is desired.

To obtain alloys having good impact toughness even at low temperatures, preference is given to core-shell particles whose rubber phases are based on butadiene.

To obtain alloys having good weathering resistance, preference is given to core-shell particles whose rubber phases are based on acrylic esters.

Core-shell particles whose rubber phases are based on organosiloxanes are preferred if the alloys are to combine good impact toughness at low temperatures, good weathering resistance and good stability in preparation and processing from the melt.

For the hard phases of the core-shell particles present in the alloy of the invention, use can be made of homopolymers and copolymers. The copolymers can here be built up of two or more monomers. A common feature of the homopolymers and copolymers is a glass transition above 50° C. The homopolymers and copolymers can be derived from the following monomers:

monoethylenically unsaturated compounds such as alkyl and aryl acrylates, where the alkyl radicals can be linear, cyclic or branched and the aryl radicals can in turn be substituted themselves, alkyl and aryl methacrylates, where the alkyl radicals can be linear, cyclic or branched and the aryl radicals can in turn be substituted themselves, substituted alkyl and aryl methacrylates and acrylates, where the substituents can be linear, cyclic or branched alkyl radicals or substituted aryl radicals, acrylonitriles and substituted acrylonitriles (e.g. methacrylonitrile, alpha-methylene glutaronitrile, alpha-ethylacrylonitrile, alpha-phenylacrylonitrile, etc.), alkyl- and arylacrylamides, vinyl esters and substituted vinyl esters, vinyl ethers and substituted vinyl ethers, vinylamides and substituted vinylamides, vinyl ketones and substituted vinyl ketones, vinyl halides and substituted vinyl halides, olefins (e.g. ethylene, propylene, butylene), cyclic olefins (e.g. norbornene, tetracyclododecene, 2-vinyl-norbornene), fluorinated monoethylenically unsaturated compounds such as tetrafluoroethylene, vinylidene fluoride, hexafluoropropene, chlorotrifluoroethylene and perfluoro (alkylvinyl ethers) and also vinyl-aromatic compounds of the general formula:

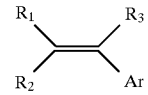

where $R_1$, $R_2$, $R_3$ are hydrogen, linear, branched or cyclic alkyl radicals, substituted or unsubstituted aryl radicals, which can be identical or different and Ar is an aromatic $C_6$–$C_{18}$-radical which can additionally bear substituents such as alkyl or halogen radicals.

The hard phases can also be cross linked, for which purpose polyfunctional unsaturated compounds such as are described, for example, in DE 2 116 653, U.S. Pat. No. 3,787,522 and EP 0 436 080 are suitable. Likewise described in these documents is the use of grafted monomers. These compounds are used to chemically bind a possible further shell to the underlying phase, if this is desired.

Suitable uncross-linked base materials for the hard phases are all polymers having glass transition temperatures above 50° C., preferably above 80° C. and particularly preferably above 100° C.

The alloy of the invention can also comprise commercially available core-shell particles, for example Staphyloid types from TAKEDA Chem. Industries as described in, for example, JP 17514 or JP 129266, Kane-Ace types from KANEKA as are described, for example, in the product brochure Kane ACE-B, Metablen C, Metablen W and Metablen E types from the METABLEN company BV, which are described in the Metablen product brochure, Blendex types from GE PLASTICS or Paraloid types from ROHM and HAAS which are described, for example, in G ächter/Müller Kunststoff-Additive, Carl Hanser Munich (1983) page XXIX ff. or the brochure PARALOID BTA 733, Impact Modifier for Clear Packaging (1987) from Rohm and Haas or the brochure PARALOID BTA-III N2 BTA-702 BTA 715 (1989) from Rohm and Haas.

The alloy of the invention contains from 2 to 50% by weight, preferably from 10 to 40% by weight and particularly preferably from 10 to 25% by weight, of core-shell particles, based on the total mass of the alloy.

The block copolymers present in the alloy of the invention comprise one or more types of block having a glass transition temperature >40° C. and one or more types of block having a glass transition temperature <–20° C. Preference is given to polymers having a COC structure in which blocks of differing cycloolefin content alternate (EP 560 090, which is hereby expressly incorporated by reference), and block copolymers which are obtained by anionic polymerization. Preference is given to di-block and tri-block copolymers.

The types of block having a glass transition temperature >40° C. preferably comprise polymers which are prepared by anionic polymerization, e.g. polystyrene, polyesters or polyurethanes. The types of block having a glass transition temperature <–20° C. preferably comprise homopolymers or copolymers which comprise polybutadiene, polysiloxenes, polyisoprene, hydrogenated polybutadiene or hydrogenated polyisoprene.

Preferred block copolymers are styrene-butadiene di-block copolymers, styrene-butadiene-styrene tri-block copolymers, styrene-isoprene di-block copolymers, styrene-isoprene-styrene tri-block copolymers and also hydrogenated products of the same, and also commercially available block copolymers such as Cariflex from Shell Chemicals (Cariflex product brochure of February 1992), Kraton G (Kraton G product brochure from Shell International Company London), Kraton (Kraton product brochure 1992 from Shell International Company London), Polysar (Polysar product brochure from Bayer) and SEP/SEPS (SEP/SEPS product brochure from Kuraray Co.).

The alloy of the invention contains from 1 to 20% by weight, preferably from 1 to 10% by weight and particularly preferably from 1 to 5% by weight, of block copolymers, based on the total mass of the alloy.

To obtain as high as possible a transparency of the alloy of the invention, suitable core-shell particles and block copolymers are those having mean refractive indices (volume mean) between 1.52 and 1.55, preferably between 1.53 and 1.54. The selection of optimum particle refractive indices and radius ratios of the core-shell particles can be determined as described in Makromol. Chem. 183 (1990) 221 for particles comprising one core and one shell or as described in M. Kerker, The Scattering of Light, Academic Press (1969), Chapter 5.4 for multi-shell particles. In particular, core-shell modifiers having a multilayer structure and comprising one core and a plurality of shells are particularly suitable for obtaining transparent impact-toughened alloys.

The alloy of the invention is prepared at temperatures above the glass transition temperature of the COC between 60° and 350° C., preferably between 100° and 150° C. and particularly preferably between 110° and 130° C.

The alloy of the invention can be prepared by conventional processes (D. D. Walsh, Comprehensive Polymer Science, Pergamon Press (1989), Chapter 5.2; J. L. White and K. Min, Comprehensive Polymer Science, Pergamon Press, (1989), page 285 ff). In particular, the components in the form of powders or granules can be processed by joint extrusion from the melt into granules or chips which can subsequently be converted into shaped articles, e.g. by pressing, extrusion or injection molding. In particular, the alloy of the invention is suitable for producing injection-molded, injection blow-molded, extrusion blow-molded or extruded shaped bodies. In addition, films and fibers can also be produced.

The alloy of the invention can, in particular, be prepared via master batches. In this process, core-shell particles in amounts of from 20 to 80% by weight, based on the total mass of the alloy, are mixed (preferably by joint extrusion) with one or more COCs and one or more block copolymers and subsequently brought to the desired final concentration by renewed mixing (preferably by joint extrusion) with one or more COCs and one or more block copolymers. This method leads to good dispersion on the core-shell particles and is preferably used when alloys having contents of from 3 to 25% by weight of core-shell particles, based on the total mass of the alloy, are produced.

The alloy of the invention has elongations at break of from 4 to 200%, preferably from 5 to 100%, particularly preferably from 10 to 30%, and notched impact toughnesses of from 2.5 to 100 KJ/m$^2$, preferably from 4 to 50 KJ/m$^2$, particularly preferably from 10 to 30 KJ/m$^2$.

The alloy of the invention can also comprise additives in customary amounts such as, for example, plastifiers, UV stabilizers, optical brighteners, antioxidants, antistatic agents, heat stabilizers or reinforcing additives such as glass fibers, carbon fibers or high-modulus fibers such as polyaramides or liquid-crystalline polyesters or similar. In addition, they can comprise fillers such as inorganic materials, talc, titanium dioxide or similar.

The alloy of the invention is suitable for a multiplicity of applications such as containers, bottles, beverage cups, medical applications such as blister packaging or injection-molded parts for anesthesia, ventilation, pediatrics or medical care facilities, household goods such as cutlery, microwave utensils, freezer boxes, bowls, tubs, in particular bath tubs, clothes pegs, toilet seats, water taps, furniture, suitcases, in particular shell suitcases, flowerpots, lids and closures for bottles, toys such as building blocks or pedal cars, extruded films, e.g. for packaging, capacitor applications, tarpaulins, building applications such as window profiles, panels, folding doors, venetian blinds, floor coverings, aircraft applications such as interior fittings for aircraft, fibers for textiles, housings for electrical appliances such as printers, visual display units, keyboards, calculators, telephones, hifi equipment, lamp housings, impact drilling machines, belt grinders, vibrational grinders, circular saws, applications at low temperatures such as refrigerator inserts or freezer components, cable sheeting, pipes, sports equipment such as protective helmets, boat hulls, surfboards, interior fittings of automobiles such as linings or dashboards, external fittings of automobiles such as bumpers, or hubcaps, semifinished parts such as seals, pipe connections or cable binders.

The alloy of the invention has a high flexural strength and a good melt stability. It has a good connecting seam strength and a high flowability which is advantageous, in particular, for injection molding applications. The mechanical properties such as, for example, dimensional stability on heating, elongation at break and notched impact toughness can be varied within wide ranges so that many fields of application are accessible. The alloy of the invention can be prepared without it being necessary to undertake optimization of the core-shell particles for the COC in complicated tests. In addition, the processing and preparation of the alloy is technically simple to carry out.

EXAMPLES

The cycloolefin copolymers, core-shell particles and the block copolymers were first dried (90° C., 24 h, reduced pressure) and subsequently jointly extruded in various weight ratios in an extruder (Haake, Rheocord System 90/Rheomex TW 100, Karlsruhe, Germany) under protective gas (argon). The alloys obtained in the form of granules were again dried as indicated above and subsequently injection molded under protective gas (argon) to give tensile bars, impact bars and plates. An injection molding machine KM 90-210 B from Krauss—Maffei, Munich, Germany was used. Physical properties of the cycloolefin copolymers and their alloys were characterized as follows.

Glass transition temperatures were determined using a differential scanning calorimeter DSC 7 from Perkin Elmer, Überlingen Germany. The heating rate was 20° C./min.

Mechanical properties such as elastic moduli, elongations at break and tensile strengths in accordance with DIN 53455 (stress-strain properties) were determined using a tensile tester 4302 from Instron, Offenbach, Germany.

Notched impact toughnesses were measured by means of an instrumented impact pendulum 5102 from Zwick, Ulm, Germany in accordance with DIN 53453.

Melt viscosities were determined using a rheometer RDS from Rheometrics, Piscataway, N.J., USA.

Viscosity numbers of the COCs used were determined in accordance with DIN 53728 (decahydronaphthalene, 135° C.).

3-point bend tests were carried out in accordance with DIN 53452/53457 on injection-molded test specimens.

The following, commercially available core-shell particles were used:
®Kane Ace M511, Kaneka Paraloid EXL 2600, Rohm and Haas
®Kane Ace B56, Kaneka
®Kane Ace B582, Kaneka.

The following, commercially available block copolymers were used:
®Cariflex TR 1102, Shell The following COCs were used:
1) COC 1

A clean and dry 75 dm³ polymerization reactor fitted with stirrer was flushed with nitrogen and then with ethylene and charged with 24 kg of norbornene (bulk polymerization). 300 ml of triisobutylaluminum solution (20% w/w in toluene) were added. The ethylene pressure was set to 20 bar gauge pressure. The reaction temperature was set to 70° C. 20 mg of isopropenyl(cyclopentadienyl)(1-indenyl)-zirconium dichloride were dissolved in 500 ml of a toluene solution of methylaluminoxane (10% by weight of methylaluminoxane having a kryoscopically-determined molecular mass of 1300 g/mol) and subsequently metered into the reactor. The ethylene pressure was maintained at 20 bar by further metered addition. After a polymerization time of 90 minutes, the reactor contents were drained into a 150 dm³ stirred vessel which had been initially charged with 500 g of Celite and 200 ml of water in 50 dm³ of a hydrogenated diesel oil fraction (®Exxsol, boiling range from 100° to 120° C. from Exxon). The mixture was stirred at 60° C. for 20 minutes.

On the filter cloth of a 120 dm³ pressure filter, a filter cake was built up of 500 g of Celite suspended in 10 dm³ of ®Exxsol. The polymer solution was filtered via the pressure filter. A nitrogen pressure of 2.8 bar was built up over the solution.

The mixture was subsequently filtered via seven candle filters (Fluid Dynamics, Dynalloy Xs 64.5 μm, 0.1 m²/candle) mounted in a steel housing. The polymer solution was stirred into 500 dm³ of acetone by means of a high speed mixer (Ultraturrax) and thus precipitated. The suspension was circulated via a 680 dm³ stirred pressure filter with open bottom valve. After closing the bottom valve, the polymer was washed three times with 200 dm³ of acetone. After the last wash, the product was predried in a stream of nitrogen at 60° C. and dried in a drying oven for 24 hours at 0.2 bar and 80° C. This gave 5.37 kg of COC 1. The viscosity number was 55 ml/g and the glass transition temperature was 143° C.

2) COC 2 is a commercially available product of Mitsui Petrochemical (®Apel 6015), which is prepared by copolymerization of tetracyclododecene and ethylene in the presence of $VOCl_2(OC_2H_5)$ as transition metal compound.

EXAMPLE 1

The following tables show the impact toughnesses and elastic moduli of pure COCs and also ternary and quaternary COC/core-shell particle/block copolymer alloys. Percentages are by weight, based on the total mass of the alloy.

| COC | Core-shell particles | Block copolymers | Impact toughness (kJ/m²) | Modulus (GPa) |
|---|---|---|---|---|
| COC 1 | — | — | 1.9 | 3.2 |
| COC 1 | M511 (16%) | TR 1102 (4%) | 10.3 | 2.1 |

-continued

| COC | Core-shell particles | Block copolymers | Impact toughness (kJ/m²) | Modulus (GPa) |
|---|---|---|---|---|
| COC 1 | M511 (20%) | — | 8.9 | 2.1 |
| COC 1 | B56 (16%) | TR 1102 (4%) | 7.5 | 2.0 |
| COC 1 | B56 (10%) | — | 5.7 | 2.1 |
| COC 1 | EXL 2600 (8%) | TR 1102 (2%) | 3.6 | 2.6 |
| COC 1 | EXL 2600 (16%) | TR 1102 (4%) | 6.9 | 2.2 |
| COC 1 | EXL 2600 (20%) | — | 2.7 | 2.2 |
| COC 1 (35%)/ COC 2 (45%) | B582 (16%) | TR 1102 (4%) | 5.4 | 2.1 |
| COC 1 (35%)/ COC 2 (45%) | B582 (8%) | TR 1102 (2%) | 3.4 | 2.6 |
| COC 1 (35%)/ COC 2 (45%) | B582 (20%) | — | 2.9 | 2.2 |

EXAMPLE 2

The following polymers were mixed in a weight ratio of 50:50 in a Haake extruder: COC1/PMMA, COC1/PMMA, COC1/PMMA, COC1/polystyrene, COC1/polystyrene, COC1/polystyrene, COC1polycarbonate, COC1/polycarbonate, COC1/polycarbonate.

In all cases, DSC measurements (Perkin Elmer DSC-7), Überkingen, Germany) found unaltered glass transition temperatures of the two components.

We claim:
1. A polymer alloy, blend or composition comprising
   (a) at least one cycloolefin copolymer containing
      0.1–99% by weight, based on the total mass of the cycloolefin copolymer, of structural units obtained the polymerization of at least one monomer of formulas (I) or (III)

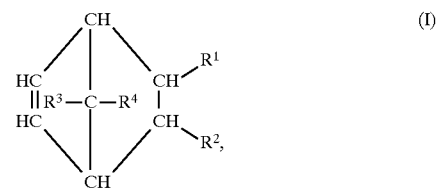

(I)

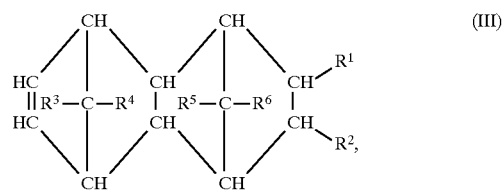

(III)

wherein the radicals $R^1$ through $R^6$ are identical or different and are hydrogen or a $C_1$–$C_{20}$-hydrocarbon radical, or two or more radicals $R^1$ to $R^6$ form a ring; and
10 to 60% by weight, based on the total mass of the cycloolefin copolymer, of structural units obtained from the polymerization of at least one acyclic olefin of the formula (VIII)

$$R^9R^{11}C=CR^{10}R^{12} \qquad (VIII)$$

where $R^9$ through $R^{12}$ are identical or different and are hydrogen or $C_1$–$C_8$ alky; and
(b) 3 to 25% by weight, based on the total weight of the alloy, blend or composition, of core-shell particles, said core-shell particles containing:
   from 30 to 60% by volume, based on the total volume of said core-shell particles, of at least one rubber phase, and from 40 to 70% by volume, based on the total volume of said core-shell particles, of at least one hard, non-rubbery phase; and (c) from 1 to 10% by weight, based on the total mass of the alloy, blend or composition, of a block copolymer.

2. A polymer alloy, blend or composition as claimed in claim 1, wherein said alloy, blend or composition has an elongation at break of 4 to 200% and a notched impact toughness of from 2.5 to 100 KJ/m².

3. A polymer alloy, blend or composition as claimed in claim 2, wherein said alloy, blend or composition has an elongation at break of at least 5% and a notched impact toughness of at least 4 KJ/m².

4. A polymer alloy, blend or composition as claimed in claim 2, wherein one or more of said cycloolefin polymers has a solubility parameter of at least about 13.5 $J^{1/2}cm^{3/2}$.

5. The polymer alloy, blend or composition as claimed in claim 1, wherein said structural units obtained from the polymerization of at least one acyclic olefin comprise units obtained from ethylene.

6. The polymer alloy, blend or composition as claimed in claim 5, wherein said cycloolefin copolymer consists essentially of structural units obtained from the polymerization of a monomer of formula (I), alone or in combination with a monomer of formula (III).

7. The polymer alloy, blend or composition as claimed in claim 1, wherein said cycloolefin copolymer comprises structural units obtained from the polymerization of ethylene and norbornene or tetracyclododecene.

8. A shaped article formed from the polymer alloy, blend or composition of claim 1.

9. A process for preparing a polymer alloy, blend or composition, comprising:

forming a masterbatch by mixing together (a) one or more cycloolefin copolymers, (b) a particulate mass comprising core-shell particles, and (c) one or more block copolymers, to obtain the masterbatch, and mixing the resulting masterbatch with one or more cycloolefin copolymers.

* * * * *